US012266233B2

(12) United States Patent
Rauscher et al.

(10) Patent No.: US 12,266,233 B2
(45) Date of Patent: Apr. 1, 2025

(54) SENSOR AND METHOD FOR CHECKING VALUE DOCUMENTS, IN PARTICULAR BANK NOTES, AND VALUE DOCUMENT PROCESSING APPARATUS

(71) Applicant: GIESECKE+DEVRIENT CURRENCY TECHNOLOGY GMBH, Munich (DE)

(72) Inventors: Wolfgang Rauscher, Parkstetten (DE); Wolfgang Deckenbach, Schechen (DE); Julia Danhof, Egling a.d. Paar (DE); Thomas Happ, Munich (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 268 days.

(21) Appl. No.: 18/017,355

(22) PCT Filed: Jul. 8, 2021

(86) PCT No.: PCT/EP2021/025251
§ 371 (c)(1),
(2) Date: Jan. 20, 2023

(87) PCT Pub. No.: WO2022/017641
PCT Pub. Date: Jan. 27, 2022

(65) Prior Publication Data
US 2023/0274599 A1 Aug. 31, 2023

(30) Foreign Application Priority Data
Jul. 23, 2020 (DE) ..................... 10 2020 004 470.0

(51) Int. Cl.
*G07D 7/1205* (2016.01)
*G07D 7/20* (2016.01)

(52) U.S. Cl.
CPC ......... *G07D 7/1205* (2017.05); *G07D 7/2008* (2013.01)

(58) Field of Classification Search
None
See application file for complete search history.

(56) References Cited

U.S. PATENT DOCUMENTS

2013/0181435 A1* 7/2013 Hersch .................. B42D 25/29
348/E5.085
2017/0154488 A1* 6/2017 Rapoport ............... B42D 25/21

FOREIGN PATENT DOCUMENTS

CN 110598699 A 12/2019
EP 3479363 A1 5/2019

OTHER PUBLICATIONS

German Search Report from corresponding German Patent Application No. 10 2020 004 470.0, Mar. 35, 2021.
(Continued)

*Primary Examiner* — Edwin C Gunberg
(74) *Attorney, Agent, or Firm* — Workman Nydegger

(57) ABSTRACT

A sensor and a method for checking value documents are provided, each having a luminescent sheet-like substrate and a luminescent feature applied to a partial surface of the substrate, and to a value document processing apparatus. From the spectral vectors obtained for a plurality of measurement points and characterizing the intensity of the luminescent radiation of the value document detected in at least two spectral ranges, substrate intensity values and feature intensity values are determined, based on which a pure substrate mask is determined, which contains only those measurement points which reliably lie outside the feature. From the spectral vectors of the measurement points contained in the pure substrate mask, a mean substrate vector is determined, based on which corrected substrate intensity values and corrected feature intensity values and/or
(Continued)

a spectral signature of the substrate and/or of the feature are or is, respectively, determined from the spectral vectors.

15 Claims, 9 Drawing Sheets

(56) References Cited

OTHER PUBLICATIONS

International Search Report from corresponding PCT Application No. PCT/EP2021/025251, Oct. 27, 2021.

* cited by examiner

| | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|
| 0 | 8 | 24 | 25 | 24 | 24 | 24 | 24 | 23 | 24 | 25 | 30 | 43 | 38 | 49 | 29 | 21 | 25 | 24 | 22 | 24 | 23 | 25 | 24 | 25 | 25 | 13 | 0 | 0 | 0 |
| 0 | 8 | 23 | 24 | 25 | 24 | 25 | 23 | 24 | 27 | 23 | 29 | 15 | 18 | 17 | 26 | 23 | 42 | 26 | 22 | 12 | 11 | 11 | 13 | 23 | 24 | 13 | 0 | 0 | 0 |
| 0 | 8 | 26 | 27 | 28 | 30 | 28 | 26 | 28 | 25 | 62 | 43 | 43 | 22 | 19 | 61 | 50 | 40 | 25 | 21 | 14 | 15 | 12 | 11 | 23 | 25 | 13 | 0 | 0 | 0 |
| 0 | 8 | 23 | 23 | 24 | 23 | 24 | 25 | 22 | 22 | 23 | 35 | 50 | 22 | 22 | 30 | 69 | 41 | 23 | 21 | 18 | 19 | 20 | 16 | 23 | 23 | 12 | 0 | 0 | 0 |
| 0 | 9 | 24 | 25 | 26 | 25 | 26 | 27 | 28 | 24 | 71 | 32 | 59 | 24 | 23 | 52 | 78 | 40 | 25 | 24 | 25 | 24 | 24 | 23 | 25 | 25 | 13 | 0 | 0 | 0 |

| | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|
| 0 | 24 | 74 | 78 | 73 | 74 | 75 | 73 | 72 | 75 | 77 | 92 | 76 | 72 | 79 | 80 | 64 | 76 | 73 | 67 | 73 | 72 | 76 | 75 | 76 | 78 | 41 | 0 | 0 | 0 |
| 0 | 24 | 71 | 73 | 76 | 75 | 77 | 71 | 73 | 84 | 70 | 89 | 45 | 39 | 53 | 69 | 46 | 85 | 79 | 68 | 38 | 32 | 33 | 41 | 71 | 75 | 40 | 0 | 0 | 0 |
| 0 | 24 | 80 | 84 | 85 | 93 | 86 | 81 | 87 | 78 | 95 | 102 | 64 | 51 | 59 | 92 | 61 | 84 | 77 | 65 | 44 | 46 | 37 | 34 | 72 | 78 | 40 | 0 | 0 | 0 |
| 0 | 24 | 69 | 69 | 74 | 70 | 75 | 76 | 68 | 68 | 70 | 76 | 72 | 68 | 68 | 73 | 88 | 81 | 70 | 65 | 56 | 60 | 61 | 49 | 70 | 69 | 37 | 0 | 0 | 0 |
| 0 | 28 | 75 | 78 | 79 | 76 | 81 | 82 | 87 | 73 | 100 | 77 | 84 | 75 | 72 | 87 | 100 | 83 | 76 | 73 | 76 | 73 | 73 | 71 | 76 | 78 | 39 | 1 | 0 | 0 |

Fig. 2

| | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|
| 0 | -1 | -4 | -4 | -4 | -4 | -4 | -4 | -4 | -4 | -4 | -5 | 22 | 16 | 28 | 0 | -4 | -4 | -4 | -4 | -4 | -4 | -4 | -4 | -4 | -4 | -2 | 0 | 0 | 0 |
| 0 | -1 | -4 | -4 | -4 | -4 | -4 | -4 | -4 | -5 | -4 | -5 | -3 | 6 | -3 | 1 | 10 | 16 | -4 | -4 | -2 | -2 | -2 | -2 | -4 | -4 | -2 | 0 | 0 | 0 |
| 0 | -1 | -4 | -5 | -5 | -5 | -5 | -5 | -5 | -4 | 40 | 8 | 28 | 5 | -3 | 40 | 40 | 13 | -4 | -4 | -2 | -3 | -2 | -2 | -4 | -4 | -2 | 0 | 0 | 0 |
| 0 | -1 | -4 | -4 | -4 | -4 | -4 | -4 | -4 | -4 | -4 | 10 | 34 | -4 | -4 | 4 | 53 | 16 | -4 | -4 | -3 | -3 | -3 | -3 | -4 | -4 | -2 | 0 | 0 | 0 |
| 0 | -2 | -4 | -4 | -4 | -4 | -5 | -5 | -5 | -4 | 50 | 6 | 42 | -4 | -4 | 29 | 59 | 14 | -4 | -4 | -4 | -4 | -4 | -4 | -4 | -4 | -2 | 0 | 0 | 0 |

| | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|
| 0 | 26 | 81 | 85 | 80 | 81 | 82 | 80 | 79 | 82 | 84 | 101 | 70 | 69 | 70 | 85 | 70 | 83 | 80 | 73 | 80 | 79 | 83 | 82 | 83 | 85 | 45 | 0 | 0 | 0 |
| 0 | 26 | 78 | 80 | 83 | 82 | 84 | 78 | 80 | 91 | 77 | 98 | 49 | 38 | 58 | 73 | 44 | 82 | 86 | 74 | 42 | 35 | 36 | 45 | 78 | 82 | 44 | 0 | 0 | 0 |
| 0 | 26 | 87 | 91 | 93 | 102 | 94 | 88 | 96 | 83 | 80 | 105 | 53 | 52 | 64 | 77 | 45 | 83 | 84 | 71 | 48 | 50 | 41 | 37 | 79 | 83 | 44 | 0 | 0 | 0 |
| 0 | 26 | 76 | 76 | 81 | 77 | 82 | 83 | 74 | 75 | 77 | 76 | 59 | 74 | 74 | 76 | 67 | 78 | 77 | 71 | 61 | 65 | 67 | 54 | 77 | 76 | 41 | 0 | 0 | 0 |
| 0 | 30 | 82 | 85 | 86 | 83 | 88 | 89 | 95 | 80 | 81 | 79 | 68 | 82 | 79 | 78 | 76 | 81 | 83 | 80 | 83 | 80 | 80 | 78 | 83 | 85 | 43 | 1 | 0 | 0 |

Fig. 3

| | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 26 | 20 | 32 | 4 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 8 | 0 | 5 | 12 | 20 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 44 | 13 | 31 | 8 | 0 | 44 | 42 | 17 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 14 | 37 | 0 | 0 | 8 | 56 | 20 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 54 | 10 | 45 | 0 | 0 | 33 | 63 | 18 | 0 | 0 | 0 | 0 | 0 | 0 | 0 | 0 | 0 | 0 | 0 | 0 |

| | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|
| 0 | 25 | 78 | 82 | 77 | 78 | 79 | 77 | 76 | 79 | 81 | 97 | 67 | 66 | 67 | 82 | 67 | 80 | 77 | 70 | 77 | 76 | 80 | 79 | 80 | 82 | 43 | 0 | 0 | 0 |
| 0 | 25 | 75 | 77 | 80 | 79 | 81 | 75 | 77 | 88 | 74 | 94 | 47 | 37 | 56 | 70 | 42 | 79 | 83 | 71 | 40 | 34 | 35 | 43 | 75 | 79 | 42 | 0 | 0 | 0 |
| 0 | 25 | 84 | 88 | 89 | 98 | 90 | 85 | 92 | 80 | 77 | 101 | 51 | 50 | 62 | 74 | 43 | 80 | 81 | 68 | 46 | 48 | 39 | 36 | 76 | 80 | 42 | 0 | 0 | 0 |
| 0 | 25 | 73 | 73 | 78 | 74 | 79 | 80 | 71 | 72 | 74 | 73 | 57 | 71 | 71 | 73 | 64 | 75 | 74 | 68 | 59 | 63 | 64 | 52 | 74 | 73 | 39 | 0 | 0 | 0 |
| 0 | 29 | 79 | 82 | 83 | 80 | 85 | 86 | 91 | 77 | 78 | 76 | 65 | 79 | 76 | 75 | 73 | 78 | 80 | 77 | 80 | 77 | 77 | 75 | 80 | 82 | 41 | 1 | 0 | 0 |

Fig. 6

SENSOR AND METHOD FOR CHECKING VALUE DOCUMENTS, IN PARTICULAR BANK NOTES, AND VALUE DOCUMENT PROCESSING APPARATUS

BACKGROUND

The invention relates to a sensor and a method for checking value documents, in particular banknotes, and to a value document processing apparatus.

For protecting value documents, such as banknotes, against counterfeiting, they can be provided with so-called luminescent features by incorporating or applying luminescent substances into or onto a value document, wherein the luminescent substances can be detected by machine using sensors and their presence and/or properties can be used for checking authenticity.

For example, a luminescence feature can be provided in the substrate, which is usually formed by paper or a film, of a value document, which provides a signal in at least two spectral detection channels of a sensor. Another luminescence feature can be provided in a locally limited manner, in particular by printing on the substrate, which delivers a signal in the same spectral detection channels, but usually with different spectral intensity ratios. By solving a linear system of equations, two intensities can be calculated for each measurement point from the measured channel intensities, namely a so-called substrate or paper intensity and a so-called print intensity.

However, it may occur that the spectral properties of the luminescent substances used, for example in different production batches, vary to a non-negligible extent. Furthermore, it is possible that the spectral sensitivity varies from sensor to sensor and/or even within a sensor, for example from measurement point to measurement point and/or track to track. A reliable authenticity check can therefore not always be guaranteed.

SUMMARY

It is an object of the invention to disclose a sensor, a method, and a value document processing apparatus for an improved checking of value documents, in particular banknotes.

According to a first aspect of the invention, a sensor for checking value documents, in particular banknotes, each having a luminescent sheet-like substrate (e.g., a full-surface luminescent substrate) and a luminescent feature applied (e.g., imprinted) on a partial surface of the substrate, comprises: a detection device which is configured to detect luminescence radiation emitted by a value document to be checked in at least two different spectral ranges in a spatially resolved manner, whereby a plurality of measurement points is obtained, to each of which a spectral vector is assigned which contains at least two intensity values which characterize the intensity of the luminescence radiation detected at the respective measurement point in each of the at least two spectral ranges, and an evaluation device which is configured a) to determine, for each of a plurality of measurement points, a substrate intensity value and a feature intensity value from the spectral vectors using a predetermined substrate basis vector and a predetermined feature basis vector, the substrate basis vector and the feature basis vector each containing at least two intensity values which characterize the expected intensity of the luminescence radiation emitted by the substrate or feature, respectively, in the at least two spectral ranges, and b) to determine, on the basis of the substrate intensity values and feature intensity values, a pure substrate mask which contains those, in particular only those, measurement points which correspond to locations on the value document which lie outside the feature, and c1) to determine, from the spectral vectors of the measurement points contained in the pure substrate mask, a mean substrate vector which contains at least two intensity values which are obtained in each case by combining, in particular by (spatial) averaging or (spatial) quantile formation, the intensity values contained in the spectral vectors for each of the at least two spectral ranges, and i) to determine, for each of a plurality of measurement points, a corrected feature intensity value and/or a corrected substrate intensity value from the spectral vectors using the mean substrate vector and/or ii) to determine a spectral signature of the substrate and/or of the feature, by which a spectral composition of the luminescence radiation emitted by the substrate and/or by the feature, respectively, is characterized, using the mean substrate vector, and/or c2) to determine a temporal behavior of the luminescence radiation emitted by the substrate and/or the feature using measurement points contained in the pure substrate mask; and d) to check, in particular with regard to authenticity, the value document on the basis of the corrected feature intensity values and/or on the basis of the corrected substrate intensity values and/or on the basis of the spectral signature of the substrate and/or of the feature and/or on the basis of the temporal behavior of the luminescence radiation emitted by the substrate and/or by the feature.

According to a second aspect of the invention, in a method for checking value documents, in particular banknotes, each having a luminescent sheet-like substrate and a luminescent feature applied (e.g., printed) on a partial surface of the substrate, luminescence radiation emitted by a value document to be checked is detected in at least two different spectral ranges in a spatially resolved manner, whereby a plurality of measurement points are obtained, to each of which a spectral vector is assigned which contains at least two intensity values which characterize the intensity of the luminescence radiation detected at the respective measurement point in the at least two spectral ranges. In the method, the following steps are also carried out:

a) for each of a plurality of measurement points, a substrate intensity value and a feature intensity value are determined from the spectral vectors using a predetermined substrate basis vector and a predetermined feature basis vector, wherein the substrate basis vector and the feature basis vector each contain at least two intensity values which characterize the expected intensity of the luminescence radiation emitted by the substrate or by the feature, respectively, in the at least two spectral ranges, b) on the basis of the substrate intensity values and feature intensity values, a pure substrate mask is determined which contains those, in particular only those, measurement points which correspond to locations on the value document which lie outside the feature, and c1) from the spectral vectors of the measurement points contained in the pure substrate mask, a mean substrate vector is determined which contains at least two intensity values which are obtained in each case by combining, in particular by averaging or quantile formation, the intensity values contained in the spectral vectors for each of the at least two spectral ranges, and i) for each of a plurality of measurement points, a corrected feature intensity value and optionally a corrected substrate intensity value are determined from the spectral vectors using the mean substrate vector and/or ii) a spectral signature of the substrate and/or of the feature, by which a spectral composition of the luminescence radiation emitted by the substrate or or by the feature, respectively, is characterized, is determined using the mean substrate vector and/or c2) using measurement points contained in the pure substrate mask, a temporal behavior of the luminescence radiation emitted by the substrate and/or feature is determined, and d) the value document is checked, in particular with regard to authenticity, on the basis of the corrected feature intensity values and, if applicable, on the basis of the corrected substrate intensity values and/or on the basis of the spectral signature of the substrate and/or of the feature and/or on the basis of the temporal behavior of the luminescence radiation emitted by the substrate and/or by the feature.

According to a third aspect of the invention, a value document processing apparatus for processing, in particular checking and/or counting and/or sorting and/or destroying, value documents, in particular banknotes, comprises a sensor according to the first aspect of the invention and a transport device which is configured to convey a value document towards the sensor and/or past the sensor and/or away from the sensor.

Another aspect of the invention relates to a computer program product comprising instructions which, when the program is executed by a computer, cause the computer to execute the method according to the second aspect.

Yet another aspect of the invention relates to a computer-readable storage medium comprising instructions which, when executed by a computer, cause the computer to perform the method according to the second aspect.

Aspects of the invention are preferably based on the approach of determining, for each of a plurality of measurement points, a substrate intensity value and a feature intensity value from the spectral vectors, which are obtained during the detection of the luminescence radiation, using a predetermined substrate basis vector and a predetermined feature basis vector, and determining, based on the determined substrate and feature intensity values, a pure substrate mask which contains (only) those measurement points which reliably lie outside the applied feature, and in particular not in the region of the edge of the value document or on the edge of the feature. For example, the pure substrate mask contains only those measurement points of the value document whose substrate intensity value is greater than or equal to a first threshold. By taking into account the measurement points contained in the pure substrate mask, or by using the spectral vectors or intensity values of the measurement points contained in the pure substrate mask, the intensities, spectral characteristics, and/or decay behavior of the luminescent radiation emitted by the substrate or by the feature can then be more accurately determined, even if the spatial distribution of the feature is not known or varies from one value document to the next.

Thus, in a first variant, a mean substrate vector is determined from the spectral vectors of the measurement points contained in the pure substrate mask by combining the intensity values of these spectral vectors for each of the at least two spectral ranges, in particular by (spatial) averaging or (spatial) quantile formation, to form a respective intensity value. The mean substrate vector obtained in this way represents the luminescence properties of the substrate, in particular the intensity values in the at least two spectral ranges and/or the spectral composition of the luminescence radiation, with higher accuracy and reliability.

Accordingly, using the mean substrate vector—analogous to the determination of the original substrate intensity values and feature intensity values from the spectral vectors—for each of a plurality of measurement points, a corrected feature intensity value and/or a corrected substrate intensity value can be determined from the spectral vectors with higher accuracy or reliability, respectively. The mean substrate vector or a vector derived therefrom, e.g. by normalization, is preferably used instead of the originally predetermined substrate base vector. Optionally, a mean feature vector or a vector derived therefrom, e.g. by normalization, can additionally be used instead of the originally predetermined feature basis vector. The corrected feature intensity values and/or corrected substrate intensity values obtained in this way can then be used in the checking, in particular authenticity checking, of the value document.

Alternatively or additionally, using the mean substrate vector, a spectral signature of the substrate and/or a spectral signature of the feature can be determined, by which a spectral composition of the luminescence radiation emitted by the substrate or the feature, respectively is characterized. The spectral signature of the substrate is preferably given by the mean substrate vector itself, a vector derived therefrom, for example by normalization, or a scalar signature value calculated therefrom. The spectral signature of the feature is preferably given by a mean feature vector, a vector derived therefrom, for example by normalization, or a scalar value calculated therefrom. The spectral signature of the substrate or the feature obtained in this way can then be used to check, in particular authenticate, the value document.

Alternatively or additionally, in a second variant, a temporal behavior of the luminescence radiation emitted by the substrate and/or feature is determined using measurement points contained in the pure substrate mask. For example, an excitation of the luminescence of the value document by means of electromagnetic radiation is performed at each measurement point, in particular by means of an electromagnetic excitation pulse. The luminescence radiation is detected for a plurality of measurement points at two or more points in time, wherein to each of the measurement points two or more intensity values are assigned which characterize the intensity of the luminescence radiation detected at the respective measurement point at the two or more points in time. In particular, the luminescence radiation emitted by the value document to be checked is detected at the measurement points on the value document in one or more of the spectral ranges in a time-resolved manner. The intensity values may be the intensity values obtained in a particular one of the spectral ranges or may be intensity values combined from two or more of the spectral ranges.

In particular, substrate values obtained for each of the points in time of the measurement points contained in the pure substrate mask can be combined—e.g. by spatial averaging—to form a mean substrate value, and the value document can be checked, in particular with regard to authenticity, using the mean substrate values of the various points in time. For example, using the mean substrate values of the various points in time, the temporal behavior of the luminescence radiation emitted by the substrate is determined and the value document is checked using a characteristic luminescence time constant of the substrate, which is determined from the determined temporal behavior.

On the basis of the luminescence radiation emitted by a value document to be checked and detected at the measurement points in a time-resolved manner or of the corresponding intensity values obtained for the measurement points contained in the pure substrate mask, a background can be determined which is subtracted from the luminescence radiation emitted by the feature and detected in a time-resolved manner or from the feature values. In particular, the background-corrected feature values of the measurement points contained in the feature mask obtained for each one of the points in time can be combined—e.g. by spatial averaging—to form a mean corrected feature value, and the value document can be checked, in particular with regard to authenticity, using the mean corrected feature values of the various points in time. For example, using the background-corrected feature values of the different points in time, the temporal behavior of the luminescence radiation emitted by the feature is determined, and the value document is checked using a characteristic luminescence time constant of the feature, which is determined from the determined temporal behavior.

When (spatially) combining the intensity values or the substrate values or the background-corrected feature values of different measurement points for each one of the points in time, those intensity values or substrate values or background-corrected feature values, respectively, are combined which are detected at the same time relative to the respective luminescence excitation at the respective measurement point, e.g. in each case at a specific time after the end of the electromagnetic excitation pulse irradiated for the respective measurement point.

In this way, the temporal course, in particular in the form of decay curves, of the luminescence radiation respectively emitted by the substrate and feature alone can be determined and used for checking, in particular authenticity checking, of the value document. Overall, this results in a more precise determination of the luminescence intensities, the spectral signature or the decay behavior of the substrate or feature, so that a more reliable checking of value documents, in particular banknotes, is possible.

A sheet-like substrate within the meaning of the present disclosure may be, for example, paper, a film or a so-called hybrid paper composed of different materials. Preferably, the substrate is provided with a luminescent feature, hereinafter also referred to as "substrate feature" or "paper feature", which emits luminescent radiation, such as ultraviolet (UV) radiation, infrared (IR) radiation or visible light, when excited by electromagnetic radiation, such as ultraviolet (UV) radiation, infrared (IR) radiation or visible light. Preferably, the excitation occurs with visible or IR radiation, and the emission of the substrate feature is preferably in the IR spectral region. The substrate feature may be present in the volume of the substrate or may be applied as a large area coating. The substrate feature need not necessarily be contained within the entire surface of the substrate. Rather, it is possible that parts of the substrate, such as windows or hologram foils (such as a so-called LEAD strip), are entirely without a measurable luminescence feature.

The feature applied to the substrate can be a feature printed on the substrate of the value document, which has one or more luminescent substance(s) applied to a partial surface of the substrate by means of a printing process and emitting luminescent radiation, such as ultraviolet (UV) radiation, infrared (IR) radiation or visible light, when excited by electromagnetic radiation, such as ultraviolet (UV) radiation, infrared (IR) radiation or visible light. The feature applied to the substrate is applied to a partial surface of the substrate, i.e., only in a spatially limited area of the substrate, so that in the remaining areas of the substrate only the luminescence of the substrate (of the substrate feature) contributes to the luminescent radiation detected by the detection device. The feature applied to the substrate is also referred to hereinafter as the "print feature". Preferably, the excitation occurs with visible or IR radiation, and the emission of the print feature is preferably in the IR spectral region.

The detection device can, for example, be a spatially resolving detector, such as a line camera or a camera with a two-dimensional detector area. However, the spatially resolving detector can also be designed as a single-track sensor or multi-track sensor, which detects the luminescence radiation emitted by the value document along one or more tracks in a spatially resolved manner, which together form a one- or two-dimensional measurement data set. However, the invention can also be applied to only one or individual lines or tracks of a measurement data set by regarding an n-track sensor as n 1-track sensors with different track positions. This can be advan-tageous if not only different feature batches, but also track-wise different batches have to be compensated in the sensor hardware.

The detection device preferably has at least two of the spatially resolving detectors by means of which the intensity of the detected luminescence radiation can be detected for each measurement point in at least two different spectral ranges or spectral channels. In the following, the terms "spectral range" and "spectral channel" are also used synonymously. The intensities or intensity values of the luminescence radiation detected in the respective spectral channels are also referred to below as "channel intensities". The intensity spectra thereby obtained for each measurement point are understood as spectral vectors whose components are given by the channel intensities.

In the sense of the present disclosure, the term "vector" can be understood—depending on the context—in the narrower as well as in the broader sense. Thus, a vector in the narrower sense may be an element of a vector space or, in the broader sense, an n-tuple of real numbers with $n \geq 2$, where n corresponds to the number of spectral channels.

The expected paper feature and the expected print feature have different, i.e. linearly inde-pendent, reference intensity spectra. These reference intensity spectra can be understood as reference basis vectors of the vector space of spectral vectors. In the context of the present disclosure, the reference basis vector of the paper feature is also referred to as the "substrate basis vector", and the reference basis vector of the print feature is also referred to as the "feature basis vector". Thus, the above-mentioned calculation of the paper and print intensities, which are also referred to as "substrate intensity values" and "feature intensity values", respectively, in the context of the present disclosure, from the measured channel intensities can be understood as a basis transformation of the respective measured spectral vector into the basis of the reference basis vectors.

Preferably, the evaluation device is configured to correct the predetermined substrate basis vector using the mean substrate vector, whereby a corrected substrate basis vector is obtained, which is subsequently also referred to as the "readapted basis vector" for the substrate or paper feature. Alternatively or additionally, it may be provided to compare the mean substrate vector with the predetermined substrate basis vector on the basis of a predetermined comparison criterion and to correct the predetermined substrate basis vector using the mean substrate vector or to replace it by the mean substrate vector if, in particular only if, the comparison criterion is fulfilled, and/or to classify the value document as a value document to be rejected if the comparison criterion is not fulfilled. The comparison of the mean substrate vector with the predetermined substrate basis vector represents a plausibility check, the passing of which is the prerequisite for a readaptation of the substrate basis vector using the mean substrate vector. This ensures that the substrate basis vector is improved or not worsened by a readaptation and thus provides more accurate results when corrected substrate and/or feature intensity values are calculated again using the readapted substrate basis vector.

Preferably, the evaluation device is configured to determine, based on the feature intensity values, a feature mask, which contains those, in particular only those, measurement points that correspond to locations lying on the feature. The feature mask contains, for example, all measurement points whose feature intensity value is greater than or equal to a second threshold. The evaluation device is configured to subtract the mean substrate vector from each of the spectral vectors of the measurement points contained in the feature mask, whereby background-corrected spectral vectors of the measurement points contained in the feature mask are obtained, and to determine, from the background-corrected spectral vectors of the measurement points contained in the feature mask, a mean feature vector which contains at least two intensity values which are obtained in each case by combining, in particular by (spatial) averaging, the intensity values contained in the background-corrected spectral vectors for each of the at least two spectral ranges. Due to the background correction based on the mean substrate vector, the mean feature vector obtained in this way represents the luminescence properties of the feature (applied to the substrate), in particular the intensity values in the at least two spectral regions and/or the spectral composition of the luminescence radiation emitted by the feature, with higher accuracy and reliability.

Preferably, the evaluation device is configured to correct the predefined feature basis vector using the mean feature vector or to replace the predefined feature basis vector with the mean feature vector, whereby a corrected feature basis vector is obtained, which is subsequently also referred to as "readapted basis vector" for the feature or print feature. The readaptation improves the accuracy of the feature basis vector so that even more reliable results can be obtained when recalculating corrected substrate and/or feature intensity values using the readapted feature basis vector.

Preferably, the evaluation device is configured to compare the intensity values of the mean substrate vector with one or more predetermined substrate intensity values and/or to compare the intensity values of the mean feature vector with one or more predetermined feature intensity values in order to check the value document, in particular with regard to authenticity.

Preferably, the evaluation device is configured to determine the corrected substrate intensity values and corrected feature intensity values using the corrected substrate basis vector and the, in particular corrected, feature basis vector from the spectral vectors. The determination of the corrected substrate intensity values and corrected feature intensity values for a plurality of measurement points is thereby preferably performed analogously to the calculation of the substrate and feature intensity values from the spectral vectors obtained during the detection of the luminescence radiation, wherein the corrected substrate basis vector is used instead of the predetermined substrate basis vector. Optionally, the corrected feature basis vector can additionally be used instead of the predetermined feature basis vector. In both cases, paper or print intensities with significantly higher reliability are obtained.

Preferably, the evaluation device is configured to check, in particular with regard to authenticity, the value document using the corrected substrate intensity values and/or corrected feature intensity values, in particular by comparing the corrected substrate intensity values of one or more measurement points or, respectively the corrected feature intensity values of one or more measurement points with one or more predetermined substrate intensity values or, respectively, one or more predetermined feature intensity values. By using the corrected substrate or feature intensity values in the checking, a much more reliable checking result can be obtained, for example with respect to a distinction between an authentic or counterfeit value document.

Furthermore, the evaluation device can preferably be configured to determine a, in particular scalar, signature value of the substrate from the at least two intensity values of the mean substrate vector when determining the spectral signature of the substrate and/or to determine a, in particular scalar, signature value of the feature from the at least two intensity values of the mean feature vector when determining the spectral signature of the feature. In particular, the signature value characterizes the spectral shape of the measured luminescence radiation independently of its absolute intensity. Preferably, the value document can then be checked, in particular with regard to authenticity, using the signature value of the substrate and/or the signature value of the feature in particular by comparing the signature value of the substrate and/or the signature value of the feature with a predetermined comparison value of the substrate or predetermined comparison value of the feature. By using the spectral signature and/or the signature value of the substrate and/or feature obtained in this way when checking the value document, an authentic value document can be distinguished from a counterfeit value document much more reliably.

Preferably, when checking the value document, it can be checked whether the at least two intensity values of the mean substrate vector, in particular all of them, are above a threshold value, and/or whether the at least two intensity values of the mean feature vector, in particular all of them, are above a (the same or another) threshold value. Furthermore, in order to check the value document, in particular with regard to authenticity, it can be checked whether or not the signature value of the substrate and/or the signature value of the feature each deviates from a specific substrate reference signature value or feature reference signature value. Alternatively or additionally, it can be checked whether the spectral signature, esp. the signature value, of the feature and the spectral signature, esp. the signature value, of the substrate are different from each other. Preferably, the check result "authentic" can be assigned to the value document only if all intensity values of the mean substrate vector and all intensity values of the mean feature vector are above a threshold value and the signature value of the feature and the signature value of the substrate are different from each other. Advantageously, it is then possible to dispense with the specification of the above-mentioned reference signature values.

Preferably, it can be provided that the detection device detects the luminescence radiation emitted by the value document to be checked in a time-resolved manner in two or more spectral channels, whereby a plurality of measurement points are obtained, to each of which two or more intensity values are assigned for each spectral channel, which characterize the intensity of the luminescence radiation detected at the two or more points in time in this spectral channel. The evaluation device is thereby preferably configured to combine the intensity values of the measurement points contained in the pure substrate mask obtained for each one of the points in time to form a mean substrate value, in particular by (spatial) averaging, whereby a mean substrate value is obtained for each of the points in time. In doing so, a mean substrate value can be determined for each of several spectral channels, or several spectral channels can be combined, for example by averaging. In this way, the temporal behavior, in particular in the form of a (possibly spectrally resolved) decay curve, which in the context of the present disclosure is also referred to as "paper decay curve" or "mean paper decay curve", of the substrate can be determined with higher reliability.

Preferably, the evaluation device for determining the temporal behavior of the luminescence radiation emitted by the feature is configured to determine, in particular by quantile formation, a background value on the basis of the intensity values of the measurement points contained in the pure substrate mask obtained for in each case one of the points in time, in particular for each of several spectral channels, wherein a background value is obtained for each of the points in time and, if applicable, each of the several spectral channels. And the evaluation device is also configured to subtract, from the intensity values of the measurement points contained in the feature mask obtained for in each case one of the points in time, the background value obtained for this point in time and, if applicable, spectral channel, whereby a corrected feature value of the measurement points contained in the feature mask is obtained for each of the points in time and spectral channels, and to combine the corrected feature values of the measurement points contained in the feature mask obtained for each of the points in time and spectral channels to form a mean corrected feature value, in particular by (spatial) averaging, whereby a mean corrected feature value is obtained for each of the points in time and in particular for each of the spectral channels.

The background values obtained for the different points in time represent the temporal course of a background of the detected luminescence radiation and are therefore also referred to as a (if applicable, spectrally resolved) "background decay curve" in the context of the present disclosure. The mean corrected feature values of the measurement points contained in the feature mask obtained for the different points in time, on the other hand, represent the temporal behavior, which is (spatially) averaged over the measurement points in the area of the feature, of the luminescence radiation, which is corrected with respect to the background, wherein this temporal behavior is also referred to in connection with the present disclosure as a "feature decay curve" or "print decay curve", which may be available for different spectral channels.

Alternatively or additionally, the evaluation device can be configured to combine the intensity values of the measurement points contained in the feature mask obtained for in each case one of the points in time and in particular for in each case one of the spectral channels to form a mean substrate feature value, in particular by (spatial) averaging, whereby a mean substrate feature value is obtained for each of the points in time and, if applicable, spectral channels. The mean substrate feature values obtained for the various points in time thus represent the temporal behavior of the luminescence radiation detected in the area of the feature, i.e., emitted in total by the (print) feature and the underlying substrate, and are therefore also referred to in the context of the present disclosure as a (if applicable, spectrally resolved) "mean combined decay curve" for the paper and the (print) feature located thereon. Preferably, the mean substrate values obtained for the points in time ("mean paper decay curve") are subtracted from the mean substrate feature values obtained for the corresponding points in time ("mean combined decay curve"), whereby a mean feature value is obtained for each of the points in time and, in particular, for each of the spectral channels. The mean feature values obtained in this way at the various points in time thus represent a mean decay curve for the pure (print) feature, i.e. without influences of the underlying substrate, which may be available for different spectral channels. Preferably, the mean paper decay curve and/or the mean decay curve of the pure (print) feature are used for checking, in particular authenticity checking, of the value document. For this purpose, for example, several spectral channels can be used individually or combined, in particular averaged.

Further preferred and/or alternative embodiments and/or aspects of the invention are explained below. Even though these explanations refer to value documents with a paper substrate, they apply accordingly to value documents with a substrate made of any material, such as plastic or hybrid paper.

Intensities

Preferably, the following steps are performed to calculate the paper and print intensities by measurement point:

- Calculation of paper and print intensities using stored reference basis vectors.
- Determination of the pure paper mask, i.e. the areas that are not overprinted.
- Readaptation of the basis vector for the paper feature using the measurement data from the pure paper region, if the spectral signature in this region passes a plausibility check.
- Optional readaptation of the basis vector for the print feature using the measurement data from the feature print area.
- Calculation of paper and print intensities using the readapted basis vectors.

Calculation of paper and print intensities using stored basis vectors: Preferably, reference basis vectors for the paper and print feature are stored in the sensor. By means of these basis vectors, paper and print intensities are determined from the channel intensities in a first step, measurement point by measurement point, by solving linear (e.g. 2×2) systems of equations. This corresponds to a base transformation. This calculation is subject to inaccuracies due to the batch-specific fluctuations of the luminescence spectra, but is sufficient to find pure paper areas, i.e. areas that are not disturbed by print.

The stored reference basis vectors can, for example, be learned basis vectors, i.e. based on a number of previous calculations (on adaptation samples or real value documents, in particular banknotes). Preferably, during adaptation, the sensor learns mean reference basis vectors for the paper (substrate) and the print feature on a track-by-track basis with respect to batch variations.

Determination of the pure paper mask: A possible approach would be to define as a pure paper mask all measurement points whose paper intensity is greater than or equal to a threshold and whose print intensity is below a second threshold. In this case, however, distortions would occur due to measurement points at the edge of the print area that are just below the threshold for the print intensity, but still do not correspond to a pure spectrum of the paper feature. To avoid this, the edge of the print area in the pure paper mask is preferably avoided as follows: The pure paper mask is defined as all measurement points whose paper intensity is greater than or equal to a threshold and for which the print intensity of all measurement points in a neighborhood, e.g. a 3×3 neighborhood, is below a second threshold.

Preferably, this is implemented by means of masks as follows (see also the examples described with reference to FIGS. 4 and 5 below):

- Determining a paper mask as all measurement points whose paper intensity is greater than or equal to a threshold.
- Determining a print mask as all measurement points whose print intensity is greater than or equal to a second threshold.
- Determining an extended print mask by applying a filter, e.g. a dilatation filter over 3×3 measurement points, i.e. in the extended print mask a measurement point is set exactly when there is a set measurement point in the original print mask in the associated 3×3 neighborhood.
- Determining a pure paper mask as a paper mask minus the extended print mask.

In the context of the present disclosure, the set of measurement points in the pure paper mask is also referred to as the "pure paper region" and the set of measurement points in the print mask is also referred to as the "feature print region".

Readaptation of the basis vectors: For each spectral channel, the measured values (intensity values) from the pure paper region are combined into one each, e.g. by averaging. This results in a mean spectral vector for the pure paper area, the mean measured paper vector (mean substrate vector).

Plausibility check for the paper feature signature: Comparison of the mean measured paper vector using a specified criterion with the reference base vector for the paper feature. If the criterion is not met, the banknote is rejected. For example, if a mean measured paper vector ($x_o$, $x_1$) is obtained for two spectral channels, it can be checked, e.g., whether the quotient $x_1/x_o$ or a quantity derived therefrom (e.g., $x_1/(x_o+x_1)=1/(1+(x_1/x_o)^{-1})$ or $\arctan(x_1/x_o)$) lies within a predetermined interval. Otherwise, the banknote is rejected.

As a result, the algorithm does not accept arbitrary paper features. It tolerates and corrects batch variations of the paper feature, but only if the measured paper feature matches the stored reference relatively well.

Readaptation of the paper basis vector: Generation of a readapted basis vector for the paper feature (corrected substrate basis vector) using the mean measured paper vector (mean substrate vector). For example, the mean measured paper vector can be used directly, or a vector of other magnitude (e.g. normalized or preserving other characteristic values) in the direction of the mean measured paper vector, or a (weighted) average between the predetermined or stored reference basis vector and the mean measured paper vector. Other calculations and boundary conditions are also possible. Optionally, the pre-stored reference basis vector for the paper feature can be replaced by the readapted basis vector or a calculation of the two vectors with each other. This results in a learning effect and an increasingly better adaptation of the reference basis vector to the real paper feature.

Optional: Readaptation of the feature basis vector, e.g. of the print basis vector: Generation of a readapted basis vector for the print feature (corrected feature basis vector) from the measured values from the feature print area. For this purpose, the mean measured paper vector (mean substrate vector) is subtracted from the measured values for each measurement point from the feature print area to obtain background-corrected measured values (background-corrected spectral vectors). The background-corrected measured values from the feature print area are combined into one value for each spectral channel, e.g. by averaging. This results in a mean spectral vector for the pure print feature (mean feature vector), which—analogous to the readaptation of the paper basis vector—can be used for the calculation of a readapted basis vector for the print feature (corrected feature basis vector). Learning of the stored basis vector can also be implemented here.

Calculation of the paper and print intensities using the readapted basis vectors: measurement point-by-measurement point determination (as in the first calculation) of the paper and print intensities from the channel intensities by solving systems of linear (2×2) equations, except that this time the readapted basis vectors are used instead of the predetermined or stored reference basis vectors of the substrate or feature.

Spectral Signature

Preferably, the following steps are performed to calculate the spectral paper and print signature:

- Determination of the spectral paper signature (spectral signature of the substrate).
- Estimation of the channel intensities of the paper substrate in the print area based on the channel intensities in the pure paper area.
- Background subtraction: subtracting the channel intensities of the paper substrate from the channel intensities in the print area and determining the spectral print signature (spectral signature of the feature) from the channel intensities obtained hereby.

Determination of the spectral paper signature and estimation of the channel intensities of the paper substrate in the print area: Preferably, the spectral paper signature corresponds to the mean measured paper vector (mean substrate vector), which can be determined in the manner already described above.

Preferably, the mean measured paper vector is thereby calculated in different ways depending on the expected banknote design. If it is assumed that the paper intensity in the feature print area is similar to the paper intensity in the pure paper area, the mean measured paper vector can preferably be determined by channel-wise arithmetic averaging of the individual measurements (spectral vectors). However, if the paper intensity in the pure paper area is locally changed compared to the feature print area (e.g. due to a print absorbing or reflecting in the relevant spectral area or due to watermarks or similar), e.g. a channel-wise quantile value (e.g. 80% quantile) provides a better estimation than the channel-wise mean value.

A quantile or quantile value is a ratio p of a sample, lying between 0 and 1 or 0% and 100%, which divides the sample such that a proportion of the sample of p is less than the empirical p quantile, and a proportion of 1−p or 100%−p of the sample is greater than the p quantile. For example, given a sample of channel-wise intensity values, the 80% quantile corresponds to that intensity value $I_{80}$, for which 80% of the intensity values in the sample are less than the intensity value Iso and 20% are greater than the intensity value Iso.

Determination of the spectral print signature: The mean measured paper vector calculated as described above is subtracted from all measured spectral vectors in the feature print area. In this way, background corrected spectral vectors are obtained for the feature print area. The background-corrected measured values from the feature print area obtained for each spectral channel are combined, e.g. by averaging, into one value each, so that a mean background-corrected spectral vector for the feature print area is obtained, which in the context of the present disclosure is also referred to as mean measured print vector or mean feature vector.

From the mean measured print vector, a scalar measure of the spectral signature of the print feature can be calculated, in the case of two spectral channels ($z_o$, $z_1$) for example as the quotient $z_i/z_o$ or a quantity derived therefrom (e.g. $z_1/(z_o+z_1)=1/(1+(z_1/z_o)^{-1})$ or $\arctan(z_1/z_o)$). This measure of the spectral signature, the signature value, can then be compared with a reference value or with corresponding thresholds for the authenticity check.

Time Behavior

Depending on the application or operation of the sensor, there may be not only a single intensity value for each measurement point and each spectral channel, but a series of two or more measured values over time (e.g., a decay curve sampled at finitely many points in time). Preferably, the background subtraction procedure described above can also be applied to a time series of measured values by applying it to the individual elements of the series. For example, the mean value (or a quantile value) of multiple series is obtained by calculating the mean value (or quantile value) over the multiple series for each element.

As with the spectral signature, one obtains preferably also with the decay curves A paper decay curve (mean substrate values for the different points in time), esp. per spectral channel, from the decay curves of the measurement points of the pure paper area, e.g. by averaging.

an estimate for the background decay curve (background values for the different points in time), esp. per spectral channel, from the decay curves of the measurement points of the pure paper area, e.g. by quantile formation.

an estimate for the print decay curve (mean corrected feature values for the different points in time), esp. per spectral channel, e.g. as mean value of the decay curves of the measurement points in the feature print area corrected with respect to the background decay curve.

Preferably, from the paper decay curve and/or the print decay curve values can be determined which characterize the decay behavior of the luminescent paper or print feature and can be compared, e.g., with predetermined comparison values for checking the value document.

BRIEF DESCRIPTION OF THE DRAWINGS

Further advantages, features and possible applications of the present invention will be ap-parent from the following description in connection with the figures showing:

FIG. 2 an example of intensity values of a luminescence radiation detected in two spectral channels K0 (top) and K1 (bottom) in a spatially resolved manner;

FIG. 3 an example of paper intensities (bottom) and print intensities (top) determined from the intensity values shown in FIG. 2;

FIG. 6 an example of paper intensities (bottom) and print intensities (top) determined using readapted basis vectors from the intensity values shown in FIG. 2;

DETAILED DESCRIPTION OF VARIOUS EMBODIMENTS

Figure 1:
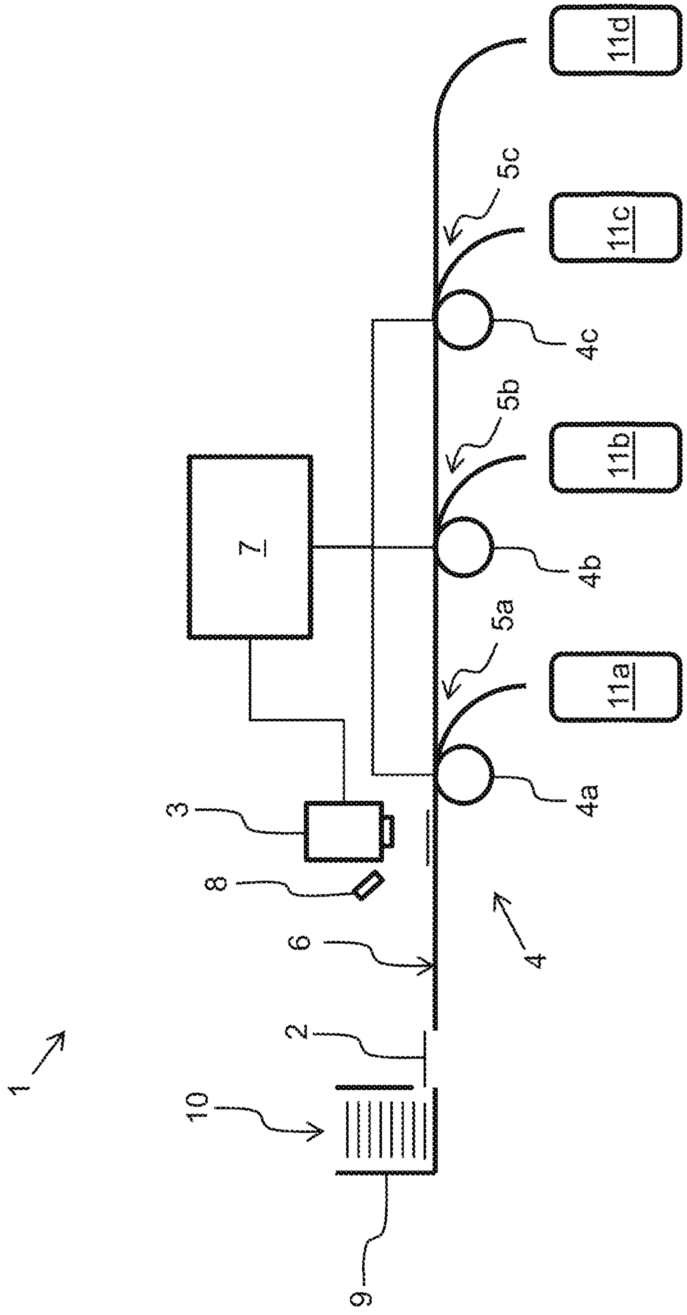
FIG. 1 an example of a value document processing apparatus with a sensor for checking value documents.

FIG. 1 shows a schematic representation of an example of a value document processing apparatus 1 with an input device 9, for example a so-called input tray, for receiving a stack 10 of value documents 2, in particular banknotes, which are individually removed from the stack 10 by means of a separating device not shown and conveyed along a transport path 6 by means of a transport device 4. In the present example, the transport device 4 has transport belts, which are guided over a plurality of transport rollers 4*a*-4*c*, shown only schematically, and switches 5*a-c*.

Furthermore, a sensor is provided for checking the value documents 2, which has at least one detection device 3 which is configured to detect electromagnetic radiation emitted by a value document 2 to be checked in at least two different spectral channels or spectral ranges in a spatially resolved manner.

In the example shown, the value documents 2 each have a sheet-shaped substrate, which is usually formed by paper, a film or a so-called hybrid paper and which is provided, for example, over its entire surface with a luminescent feature, so that it can be excited to emit luminescent radiation, for example by irradiation with an electromagnetic excitation radiation. In addition, a further luminescence feature is locally applied to, in particular printed on, a partial surface of the substrate, which is also referred to as a "print feature" or "feature" and can also be excited to emit luminescence radiation.

Furthermore, an irradiation device 8 is provided, e.g. an IR light source, which is configured to irradiate the value document 2 to be checked with electromagnetic excitation radiation so that the substrate and the feature applied or printed thereon can be excited to emit luminescence radiation.

The luminescence radiation detected by the detection device 3 in a spatially resolved manner thus provides signals for each measurement point in the at least two different spectral channels, which represent a measure of the spectral intensities of the detected luminescence radiation. For the area of the substrate without an applied or printed feature, different spectral intensity ratios are usually obtained than for the area of the applied or printed feature.

The detection device 3 may be any type of sensor system for spatially resolved detection of the luminescence radiation emitted by the value document 2 in the visible and/or non-visible (e.g. ultraviolet and/or infrared) spectral range, such as a camera or a single-track or multi-track sensor. Optionally, further sensors (not shown), such as ultrasonic, magnetic and/or capacitive sensors, may be provided in the value document processing apparatus 1 for detecting further properties of the value documents 2.

On the basis of the luminescence radiation detected in at least two spectral ranges by means of the detection device 3 and/or properties detected by means of any further sensors, the value document 2 is checked in an evaluation device 7, for example with regard to authenticity, soiling and/or condition, and output to one of several output compartments 11*a-d* depending on the result of the check. For this purpose, the switches 5*a-c* are controlled or actuated accordingly by the evaluation device 7 and/or a control device. Preferably, the evaluation device 7 is designed as a computer and/or the evaluation device 7 has a processor for data processing and a memory for storing data.

The processing or evaluation of the luminescence radiation, which is detected in the at least two spectral ranges in a spatially resolved manner, in the evaluation device 7 is explained in more detail below by means of examples.

Intensities

FIG. 2 shows an example of intensity distributions of the luminescence radiation emitted by a banknote in two different spectral channels K0 (top) and K1 (bottom). The numbers indicate the measured intensities I0, I1 or at least a measure for the intensities I0, I1 at the respective measurement point in the respective spectral channel.

In the example, stripes of zero measurements are visible at the left and right edges, respectively, which correspond to measurements outside the banknote, whereas luminescence intensities were measured in both spectral channels at all measurement points inside the banknote.

In the present example, the measured intensities I0 and I1 of the luminescence radiation detected for each of the measurement points in the spectral channels K0 and K1 result from the intensities $I_P$ and $I_D$ of the luminescence radiation emitted by the paper (substrate) and print feature, respectively, as follows:

$$I0=b_{0,P}\,I_P+b_{0,D}\,I_D \text{ and}$$

$$I1=b_{1,P}\,I_P+b_{1,D}\,I_D,$$

where the coefficients $b_{0,P}$ and $b_{1,P}$ form a reference basis vector ($b_{0,P}$, $b_{1,P}$) for the paper feature and the coefficients $b_{0,D}$ and $b_{1,D}$ form a reference basis vector ($b_{0,D}$, $b_{1,D}$) for the print feature. Accordingly, the intensities I0 and I1 obtained for each of the measurement points each form a vector (I0, I1), which is also referred to as a spectral vector in the context of the present disclosure.

The mentioned coefficients or the corresponding reference basis vectors can be stored in the evaluation device 7. They were determined during previous measurements, for example, and can be readapted using machine learning if necessary.

With the reference basis vectors presupposed as known or predetermined, or the corresponding coefficients, the two equations given above for I0 and I1 represent a 2×2 system of equations that can easily be resolved for the intensities $I_P$ and $I_D$ for the paper (substrate) or print feature. This applies accordingly to more than two spectral channels and/or more than two different luminescence features, preferably with the number of spectral channels matching the number of different luminescence features. This enables an unique solution of the system of equations. In the present example, as described above, the paper and print intensities for each measurement point are calculated from the measured intensities I0 and I1 using stored reference basis vectors (0.9397, 0.3420) for the paper feature and (0.4848, 0.8746) for the print feature.

FIG. 3 illustrates the obtained distributions of the paper intensity (bottom) and the print intensity (top) as 2D distributions. In particular, in the case of the print intensity distorted negative values occur, which is attributed to the fact that the spectral signatures, i.e. the spectral composition of the luminescence radiation emitted in each case, of the feature substances actually present deviate from the reference basis vectors used, so that the calculation of the intensities is subject to errors. Therefore, the intensity distributions from FIG. 3 are only used to determine a paper mask and a print mask.

Using the paper intensities shown in FIG. 3 (bottom), the paper mask is now calculated, for example, as follows: All measurement points with a paper intensity ≥10 are set to "1" in the paper mask, the remaining measurement points to "0". In the resulting paper mask shown in FIG. 4 (top), the edge areas outside the banknote are clearly visible.

Figure 4:
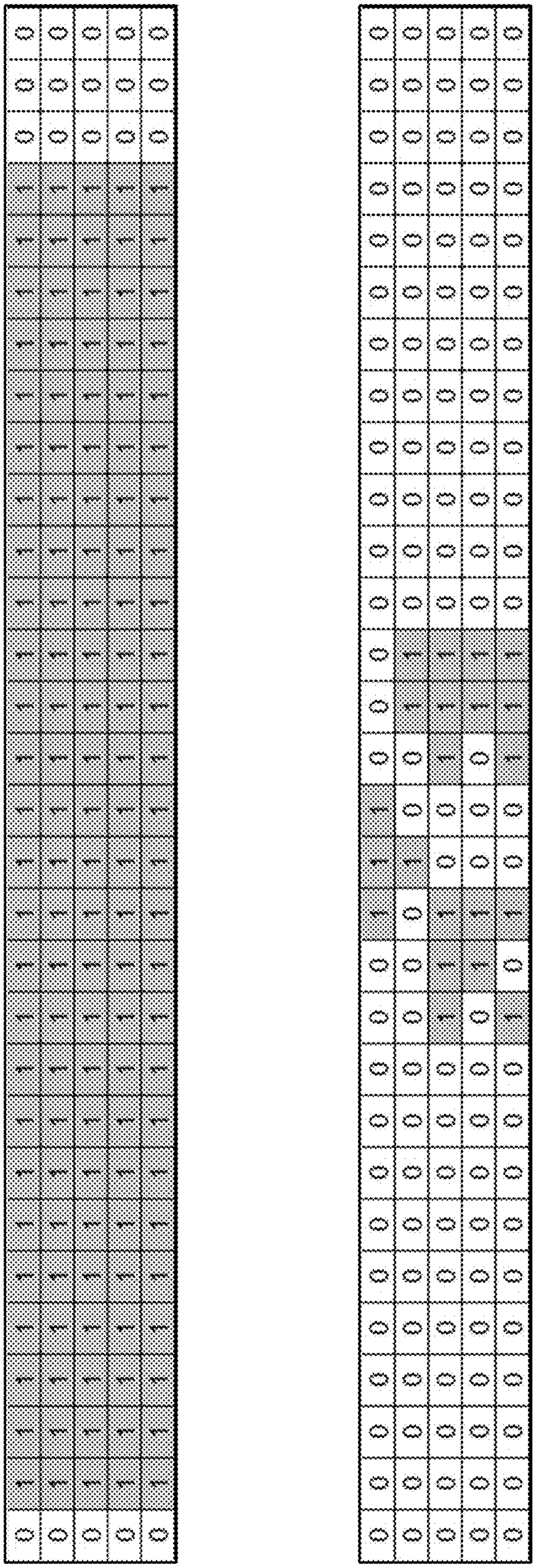
FIG. 4 an example of a paper mask (top) and a print mask (bottom)
Figure 5:
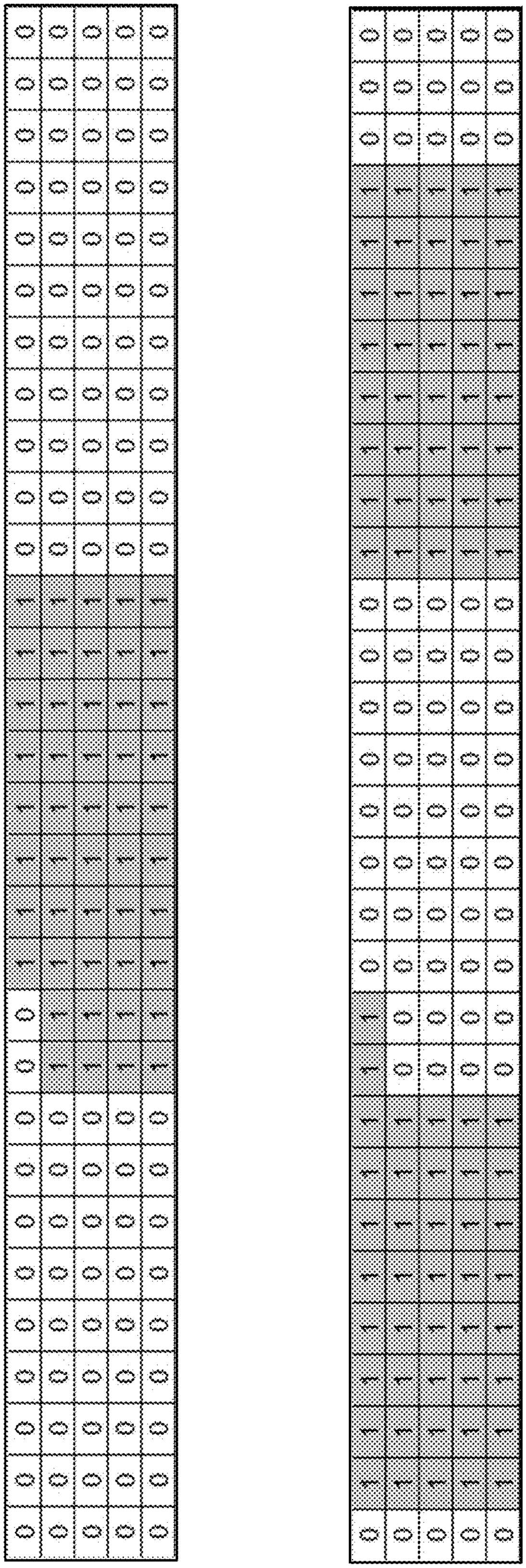
FIG. 5 an example of an extended print mask (top) and a pure paper mask (bottom)

Analogously, using the print intensities shown in FIG. 3 (top), the print mask is calculated, for example, as follows: All measurement points with a print intensity ≥10 are set to "1" in the print mask, the remaining measurement points to "0". The resulting print mask is shown in FIG. 4 (bottom). In an extended print mask, those measurement points receive the value "1", in whose 3×3 environment at least one measurement point in the print mask has the value "1". This closes holes in the print mask and avoids edge measurement points with a small but measurable contribution of the print feature. The resulting extended print mask is shown in FIG. 5 (top). A pure paper mask corresponds to the paper mask minus the extended print mask and is shown in FIG. 5 (bottom).

By averaging the spectral vectors (I0, I1) of the measurement points contained in the pure paper region, a mean measured paper vector (65.44, 21.26) is obtained. The normalized mean measured paper vector (0.9511, 0.3090) serves as readapted basis vector for the paper feature. By means of the readapted basis vector for the paper feature, the paper and print intensity can now be calculated again for each measurement point. FIG. 6 shows the resulting paper intensities (bottom) and print intensities (top). As can be seen, there are no more distorted, negative values—as in FIG. 3. This shows that the (renewed) calculation of the paper and print intensities using the readapted basis vectors enables a higher accuracy of the intensity determination.

Spectral Signature

Figure 7:
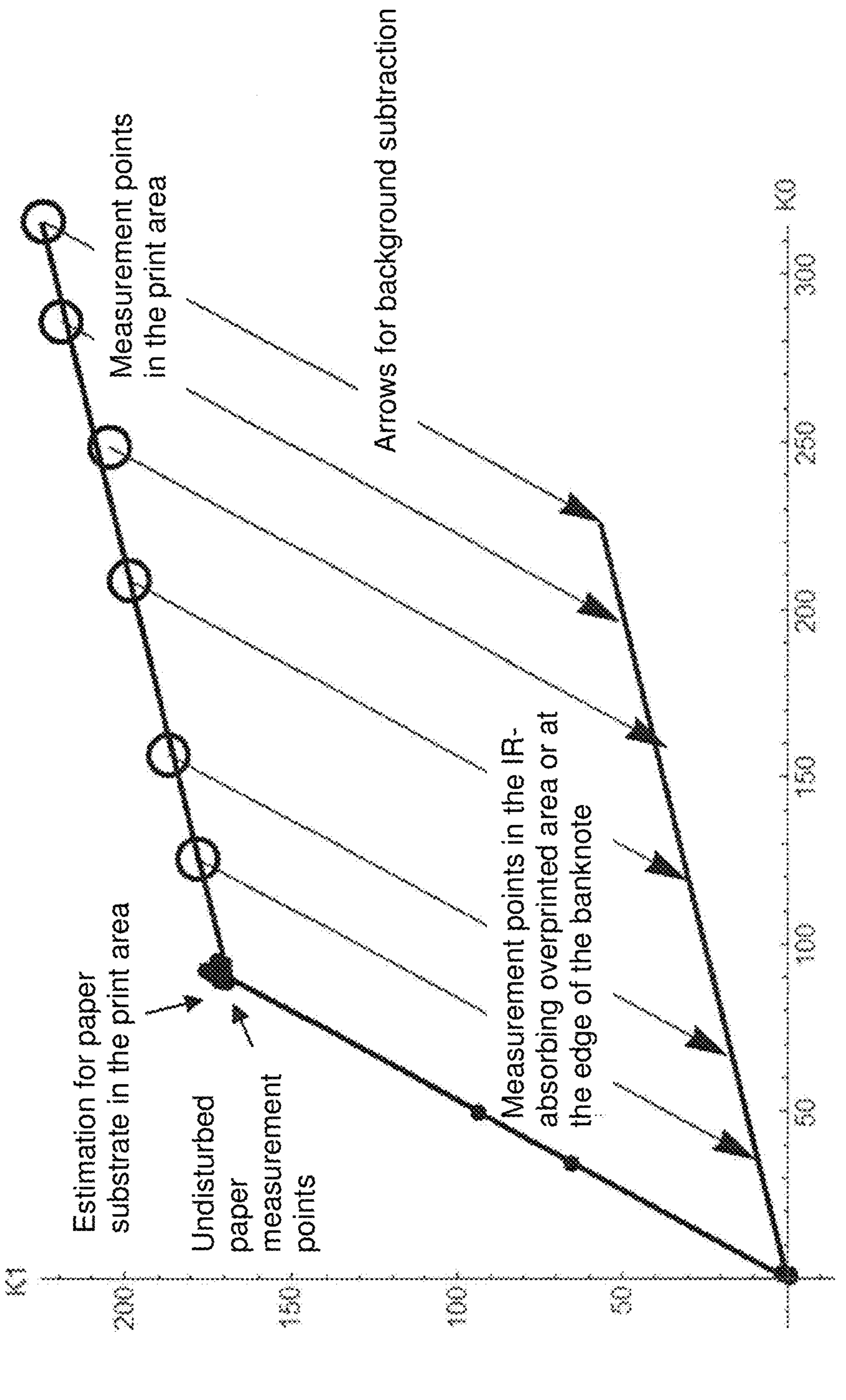
FIG. 7 a first example of a scatter plot illustrating intensity values of luminescence radiation detected in two spectral channels K0 and K1.

FIG. 7 shows an example of the recorded luminescence intensities of a banknote in two spectral channels K0 and K1 as a scatter plot. Each point and each circle corresponds to a measurement point, the ordinate shows the intensity in channel K1 and the abscissa the intensity in channel K0. The spectral vectors represented as points correspond to the pure paper feature. They all fall on a line through the origin and differ only in their magnitude, for example due to absorbing overprintings.

Many of these spectral vectors are also very similar in magnitude and nearly coincide at ap-proximately (80, 170). These spectral vectors correspond to the undisturbed paper feature. In addition, there are spectral vectors represented as circles, which do not lie on the mentioned origin line. They correspond to measurement points in the feature-print area, i.e. where the paper and the print feature contribute to the detected intensity of the luminescence radiation. Typically, these measurement points lie on a second straight line that intersects the first straight line at the point of the undisturbed paper feature. This illustrates that the luminescence in the feature print area is composed of the (undisturbed) luminescence of the paper feature and the luminescence of the print feature. The intensity of the print feature can vary due to the print design (ink distribu-tion and thickness).

For the background subtraction, the mean measured paper vector is calculated as described above, which corresponds to the cluster of measurement points of the undisturbed paper feature. The mean measured paper vector is then subtracted from all spectral vectors from the feature print area, which is illustrated by the arrows in FIG. 7.

Figure 8:
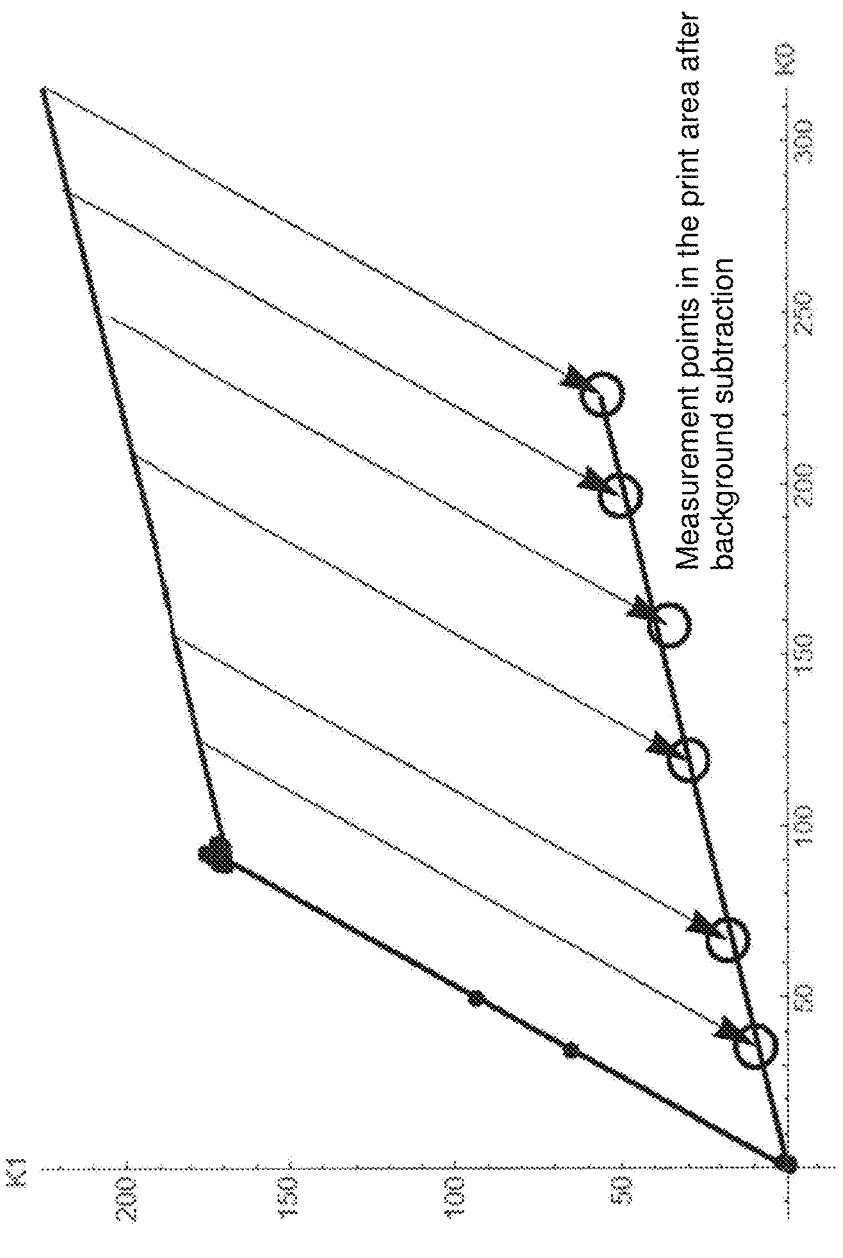
FIG. 8 a second example of a scatter plot illustrating the determination of the spectral signature of the print feature.

The background-corrected measured values then lie on an origin line, as shown in FIG. 8. This origin line corresponds to the spectral signature of the print feature, in this example about (230, 50).

Time Behavior

To evaluate the time behavior of the print feature, the pure paper area and the feature print area are first determined as described above. For each measurement point, at least one decay curve is available in the form of two or more time-shifted intensity measurements. Optionally, more than one decay curve may also be available for each measurement point, e.g. decay curves for several spectral channels. The decay curves of all measurement points in the pure paper area are calculated with each other (e.g. by averaging) to obtain a mean paper decay curve. For example, each spectral channel is treated separately. Likewise, the decay curves of all measurement points in the feature print area are calculated with each other (e.g. by averaging) to obtain a mean combined decay curve per spectral channel.

Figure 9:
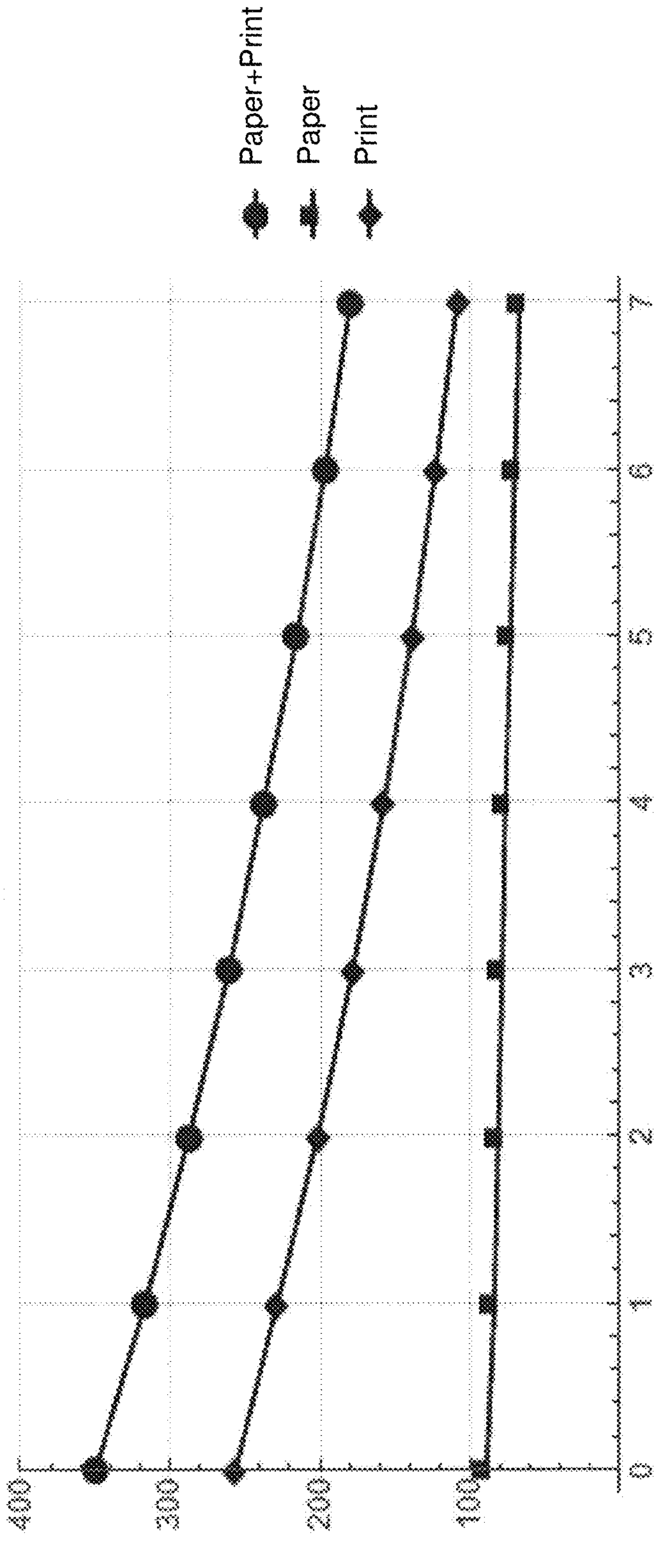
FIG. 9 examples of decay curves.

FIG. 9 shows an intensity-time diagram (in arbitrary units) with the mean paper decay curve of a spectral channel (“paper”, squares) and the mean combined decay curve (“paper+print”, circles) of the same spectral channel for an exemplary banknote. By subtracting the two curves, the mean decay curve of the spectral channel for the pure print feature (“print”, checks) is obtained, which can be further evaluated and/or used in the checking of the banknote.

The invention claimed is:

1. A sensor for checking value documents, in particular banknotes, each having a luminescent sheet-like substrate and a luminescent feature applied to a partial surface of the substrate, comprising:

a detection device which is configured to detect luminescence radiation emitted by a value document to be checked in at least two different spectral ranges in a spatially resolved manner, wherein a plurality of measurement points is obtained, to each of which a spectral vector is assigned which contains at least two intensity values which characterize the intensity of the luminescence radiation detected at the respective measurement point in the at least two spectral ranges, and an evaluation device which is configured a) to determine, for each of a plurality of measurement points, a substrate intensity value and a feature intensity value from the spectral vectors using a predetermined substrate basis vector and a predetermined feature basis vector, the substrate basis vector and the feature basis vector each having at least two intensity values, which characterize the expected intensity of the luminescence radiation emitted by the substrate or feature, respectively, in the at least two spectral regions, b) to determine, on the basis of the substrate intensity values and feature intensity values, a pure substrate mask which contains those measurement points which correspond to locations on the value document which lie outside the feature, and c1) to determine, from the spectral vectors of the measurement points contained in the pure substrate mask, a mean substrate vector which contains at least two intensity values which are obtained in each case by combining, in particular by averaging or quantile formation, the intensity values contained in the spectral vectors for each of the at least two spectral ranges, and i) to determine, for each of a plurality of measurement points, a corrected feature intensity value and/or a corrected substrate intensity value from the spectral vectors using the mean substrate vector, and/or ii) to determine a spectral signature of the substrate and/or a spectral signature of the feature, by which a spectral composition of the luminescence radiation emitted by the substrate or the feature, respectively, is characterized, using the mean substrate vector, and/or c2) to determine a temporal behavior of the luminescence radiation emitted by the substrate and/or the feature using measurement points contained in the pure substrate mask, and d) to check, in particular with regard to authenticity, the value document on the basis of the corrected feature intensity values and/or on the basis of the corrected substrate intensity values and/or on the basis of the spectral signature of the substrate and/or of the feature and/or on the basis of the temporal behavior of the luminescence radiation emitted by the substrate and/or by the feature.

2. The sensor according to claim 1, wherein the evaluation device is configured to correct the predetermined substrate basis vector using the mean substrate vector or to replace the predetermined substrate basis vector with the mean substrate vector, wherein a corrected substrate basis vector is obtained.

3. The sensor according to claim 1, wherein the evaluation device is configured to compare the mean substrate vector with the predetermined substrate basis vector using a predetermined comparison criterion, and, if the comparison criterion is met, to correct the substrate basis vector using the mean substrate vector or to replace the substrate basis vector with the mean substrate vector, and/or if the comparison criterion is not met, to classify the value document as a value document to be rejected.

4. The sensor according to claim 1, wherein the evaluation device is configured to, to determine, on the basis of the feature intensity values, a feature mask which contains those measurement points which correspond to locations lying on the feature, subtract the mean substrate vector from each of the spectral vectors of the measurement points contained in the feature mask, wherein background-corrected spectral vectors of the measurement points contained in the feature mask are obtained, and determine, from the background-corrected spectral vectors of the measurement points contained in the feature mask, a mean feature vector which contains at least two intensity values each of which being obtained by combining, in particular by averaging, the intensity values contained in the background-corrected spectral vectors for each of the at least two spectral ranges.

5. The sensor according to claim 4, wherein the evaluation device is configured to correct the predetermined feature basis vector using the mean feature vector or to replace the predetermined feature basis vector with the mean feature vector, wherein a corrected feature basis vector is obtained.

6. The sensor according to claim 2, wherein the evaluation device is configured to determine the corrected substrate intensity values and corrected feature intensity values using the corrected substrate basis vector and the, in particular corrected, feature basis vector from the spectral vectors.

7. The sensor according to claim 1, wherein the evaluation device is configured, for checking the value document, in particular with regard to authenticity, to compare the corrected substrate intensity values of one or more measurement points or the intensity values of the mean substrate vector with one or more predetermined substrate intensity values, and/or to compare the corrected feature intensity values of one or more measurement points or the intensity values of the mean feature vector with one or more predetermined feature intensity values.

8. The sensor according to claim 1, wherein the evaluation device is configured:

to determine, when determining the spectral signature of the substrate, a, in particular scalar, signature value of the substrate from the at least two intensity values of the mean substrate vector, and/or to determine, when determining the spectral signature of the feature, a, in particular scalar, signature value of the feature from the at least two intensity values of the mean feature vector, wherein the evaluation device is in particular configured, for checking the value document, in particular with regard to authenticity, on the basis of the spectral signature of the substrate and/or on the basis of the spectral signature of the feature, to compare the signature value of the substrate and/or the signature value of the feature in each case with one or more predetermined comparison value(s) of the substrate or with one or more predetermined comparison value(s) of the feature, respectively.

9. The sensor of claim 8, wherein, during checking, the check result "authentic" is assigned to the value document if the at least two intensity values of the mean substrate vector are above a threshold and the at least two intensity values of the mean feature vector are above the same or above another threshold, and the signature value of the feature and the signature value of the substrate are different from each other.

10. The sensor according to claim 1, wherein the detection device is configured to detect the luminescence radiation emitted by the value document to be checked for a plurality of measurement points at two or more points in time, wherein to each of the measurement points two or more intensity values are assigned which characterize the intensity of the luminescence radiation detected at the respective measurement point at the two or more points in time.

11. The sensor according to claim 10, wherein the evaluation device is configured to determine, on the basis of the intensity values, obtained for each one of the points in time, of the measurement points contained in the pure substrate mask, a background value, in particular by quantile formation, wherein for each of two or more points in time a background value is obtained, and to determine, on the basis of the feature intensity values, a feature mask which contains those measurement points which correspond to locations lying on the feature, and to subtract, from the intensity values, obtained for each one of the points in time, of the measurement points contained in the feature mask, the background value respectively obtained for this point in time, wherein a corrected feature value of the measurement points contained in the feature mask is obtained for each of two or more points in time, and to combine the corrected feature values, obtained for each one of the points in time, of the measurement points contained in the feature mask to form a mean corrected feature value, in particular by averaging, wherein a mean corrected feature value is obtained for each of two or more points in time, and to check the value document, in particular with regard to authenticity, using the mean corrected feature values of two or more of the points in time.

12. The sensor according to claim 10, wherein the evaluation device is configured, to determine, for determining the temporal behavior of the luminescence radiation emitted by the substrate, a mean substrate value for each of two or more of the points in time or each of the points in time, wherein the respective mean substrate value of the respective point in time is obtained by combining, in particular by averaging, the intensity values of the measurement points contained in the pure substrate mask, and to check the value document, in particular with regard to authenticity, using the mean substrate values of two or more of the points in time.

13. The sensor according to claim 12, wherein the evaluation device is configured, to determine, on the basis of the feature intensity values, a feature mask containing those measurement points which correspond to locations lying on the feature, and to combine the intensity values of the measurement points contained in the feature mask respectively obtained for one of the points in time to form a mean substrate feature value, in particular by averaging, wherein one mean substrate feature value is obtained for each of several of the points in time, and to subtract the mean substrate values obtained for the points in time from the mean substrate feature values obtained for the points in time, wherein one mean feature value is obtained for each of several points in time, and to check the value document, in particular with regard to authenticity, on the basis of the mean feature values of two or more of the points in time.

14. A value document processing apparatus for processing, in particular checking and/or counting and/or sorting and/or destroying, value documents, in particular banknotes, comprising a sensor according to claim 1 and a transport device which is configured to convey a value document towards the sensor and/or past the sensor and/or away from the sensor.

15. A method for checking value documents, in particular banknotes, each having a luminescent sheet-like substrate and a luminescent feature applied to a partial surface of the substrate, wherein luminescence radiation emitted by a value document to be checked is detected in at least two different spectral ranges in a spatially resolved manner, wherein a plurality of measurement points are obtained, to each of which a spectral vector is assigned which contains at least two intensity values which characterize the intensity of the luminescence radiation detected at the respective measurement point in the at least two spectral ranges, and wherein a) for each of a plurality of measurement points, a substrate intensity value and a feature intensity value are determined from the spectral vectors using a predetermined substrate basis vector and a predetermined feature basis vector, the substrate basis vector and the feature basis vector each having at least two intensity values, which characterize the expected intensity of the luminescence radiation emitted by the substrate or feature, respectively, in the at least two spectral regions, b) on the basis of the substrate intensity values and feature intensity values, a pure substrate mask is determined which contains those measurement points which correspond to locations on the value document lying outside the feature, and c1) from the spectral vectors of the measurement points contained in the pure substrate mask, a mean substrate vector is determined which contains at least two intensity values which are obtained in each case by combining, in particular by averaging or quantile formation, the intensity values contained in the spectral vectors for each of the at least two spectral ranges, and i) for each of a plurality of measurement points, a corrected feature intensity value and optionally a corrected substrate intensity value is determined from the spectral vectors using the mean substrate vector, and/or ii) a spectral signature of the substrate and/or of the feature, by which a spectral composition of the luminescence radiation emitted by the substrate or the feature, respectively, is characterized, is determined using the mean substrate vector, and/or c2) using measurement points contained in the pure substrate mask, a temporal behavior of the luminescence radiation emitted by the substrate and/or by the feature is determined, and d) the value document is checked, in particular with regard to authenticity, on the basis of the corrected feature intensity values and/or on the basis of the corrected substrate intensity values and/or on the basis of the spectral signature of the substrate and/or of the feature and/or on the basis of the temporal behavior of the luminescence radiation emitted by the substrate and/or by the feature.

* * * * *